(12) United States Patent
Wood

(10) Patent No.: US 7,104,518 B1
(45) Date of Patent: Sep. 12, 2006

(54) AUTOMATIC VALVE MANUAL LOCK OUT

(76) Inventor: George William Wood, 307 Johnston Rd., Ninety Six, SC (US) 29666

( * ) Notice: Subject to any disclaimer, the term of this patent is extended or adjusted under 35 U.S.C. 154(b) by 0 days.

(21) Appl. No.: 11/256,288

(22) Filed: Oct. 21, 2005

(51) Int. Cl.
*F16K 35/00* (2006.01)

(52) U.S. Cl. .................. 251/93; 251/91; 251/292; 70/177

(58) Field of Classification Search ............ 251/90–93, 251/289, 292; 137/385; 70/175–177
See application file for complete search history.

(56) References Cited

U.S. PATENT DOCUMENTS

| | | | | |
|---|---|---|---|---|
| 2,746,478 | A | * | 5/1956 | Johnson .................. 251/93 |
| 4,534,379 | A | * | 8/1985 | Burge .................... 137/385 |
| 4,647,007 | A | | 3/1987 | Bajka |
| 5,139,041 | A | * | 8/1992 | Albrecht .................. 251/93 |
| 5,143,114 | A | | 9/1992 | Daniels |
| 6,148,851 | A | * | 11/2000 | Friedline et al. ......... 137/385 |
| 6,361,017 | B1 | * | 3/2002 | Nimberger et al. ........ 251/91 |
| 6,604,391 | B1 | * | 8/2003 | Vellette et al. .......... 70/177 |
| 6,622,536 | B1 | | 9/2003 | Fuller |

* cited by examiner

*Primary Examiner*—John Bastianelli

(57) ABSTRACT

A ready method to disconnect the motive power of an actuator from the input of a valve. A handle is inserted onto the coupling held in the housing, disconnecting the motive power of the actuator and engaging the driven piece connected to the input shaft of the valve. With this handle in place, manual control of the valve is attained and the handle indicates position. The housing can be orientated so that the handle can be inline with the valve action as normally done on manually operated valves. The position of the valve may be fixed by locking the handle to the housing, removing automatic control of the valve. When the handle is removed from the coupling, normal automatic operation is restored. The handle may store at the valve for ready use by maintenance or in a secure location to prevent unauthorized use.

1 Claim, 10 Drawing Sheets

[20] 21

[21] 22

[22] 23

AUTOMATIC VALVE MANUAL LOCK OUT

RELATED APPLICATIONS

The present application is related to U.S. Pat. No. 6,622,536, issued Sep. 23, 2003, for BALL VALVE LOCKOUT, by Robert Fuller, Chris Davis, included by reference herein.

The present application is related to U.S. Pat. No. 5,143,114, issued Sep. 1, 1992, for BALL VALVE LOCKOUT MECHANISM, by Keith Daniels, included by reference herein.

The present application is related to U.S. Pat. No. 4,647,007, issued Mar. 3, 1987, for VALVE ACTUATOR WITH MANUAL DISENGAGEMENT ASSEMBLY, by Peter Bajka, included by reference herein.

FIELD OF THE INVENTION

The present invention relates to automatic process control valves and, more particularly, to valves that require up to ninety degrees of rotation for the full range of control.

BACKGROUND OF THE INVENTION

Modern industry piping uses rotary actuated valves such as ball or butterfly valves to control the flow of a process medium to and from equipment such as tanks and pumps. These valves use up to ninety degrees of rotation to span the full range of control. These valves may be manually operated with a handle actuated by a human process operator or actuated by other means such as compressed air, electric motors, hydraulic pressure, compressed springs and or combinations of these forces from remote locations. This combination of valve and powered actuator is called an automatic valve. Manually operated valves with a handle attached can usually be locked in any number of positions to suit plant conditions and meet regulatory requirements for personal safety during maintenance. Rotary actuated valves with automatic operators have had the manual lever replaced with a solid coupling to an operator and is controlled remotely. This automatic operator presents problems with providing a lock out of the valve as may be required to perform maintenance activities down stream of the valve. OHSA requires a physical device that prevents the unauthorized movement of the valve that might release hazardous energy when work is performed downstream.

One approach to this problem includes the addition of manual block valves downstream, in line with the automatic valves to provide a means to lock out hazards. The power to the automatic valve actuator may be locked out in some cases. The systems process medium can be flushed and drained. The actuator may be removed and the valve then fitted and locked with a handle and locking mechanism.

The additional manual block valves requires foresight in the design stage and adds expense. To remove the motive power to an actuator has very limited use, for example it may provide a undesired position on loss of power. It can take considerable time and expense to flush and drain a large system. Removing the actuator presents its own set of hazards.

It is therefore an object of the invention to allow greater flexibility in design of piping systems where maintenance activities will take place.

It is another object of the invention to allow existing installed automatic rotary actuated valves to be retrofitted with this device.

It is another object of the invention to allow existing installed valves being fitted with automatic actuators to incorporate this device.

It is another object of the invention to allow new automatic valves, being readied for installation, to have this device incorporated.

It is another object of the invention to allow any valve fitted with this device to be operated manually.

It is another object of the invention to allow any valve fitted with this device to be manually set to any position regardless of the automatic process input.

It is another object of the invention to allow any valve fitted with this device to be locked in any position required for OSHA compliance.

It is another object of the invention to have any valve fitted with this device to operate automatically when the handle is not inserted and in use.

It is another object of the invention to have any valve fitted with this device to provide a visual indication of automatic or manual operation to be indicated by the insertion of the lever.

It is another object of the invention to have any valve fitted with this device to provide a visual indication of the position of the valve when the valve is in the manual mode.

SUMMARY OF THE INVENTION

In accordance with the present invention, there is provided a ready method to disconnect the motive power of the output of the actuator from the input of the valve. A handle is inserted onto a sliding coupling, disconnecting the motive power of the actuator and engaging the driven piece connected to the input shaft of the valve. With this handle in place, manual control of the valve is attained, position of the valve is indicated by the handle, position of the valve may be locked by the handle to the housing of the device and remote control of the valve is temporarily eliminated. When the handle is removed from the coupling, normal automatic operation is restored.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Figure 1:
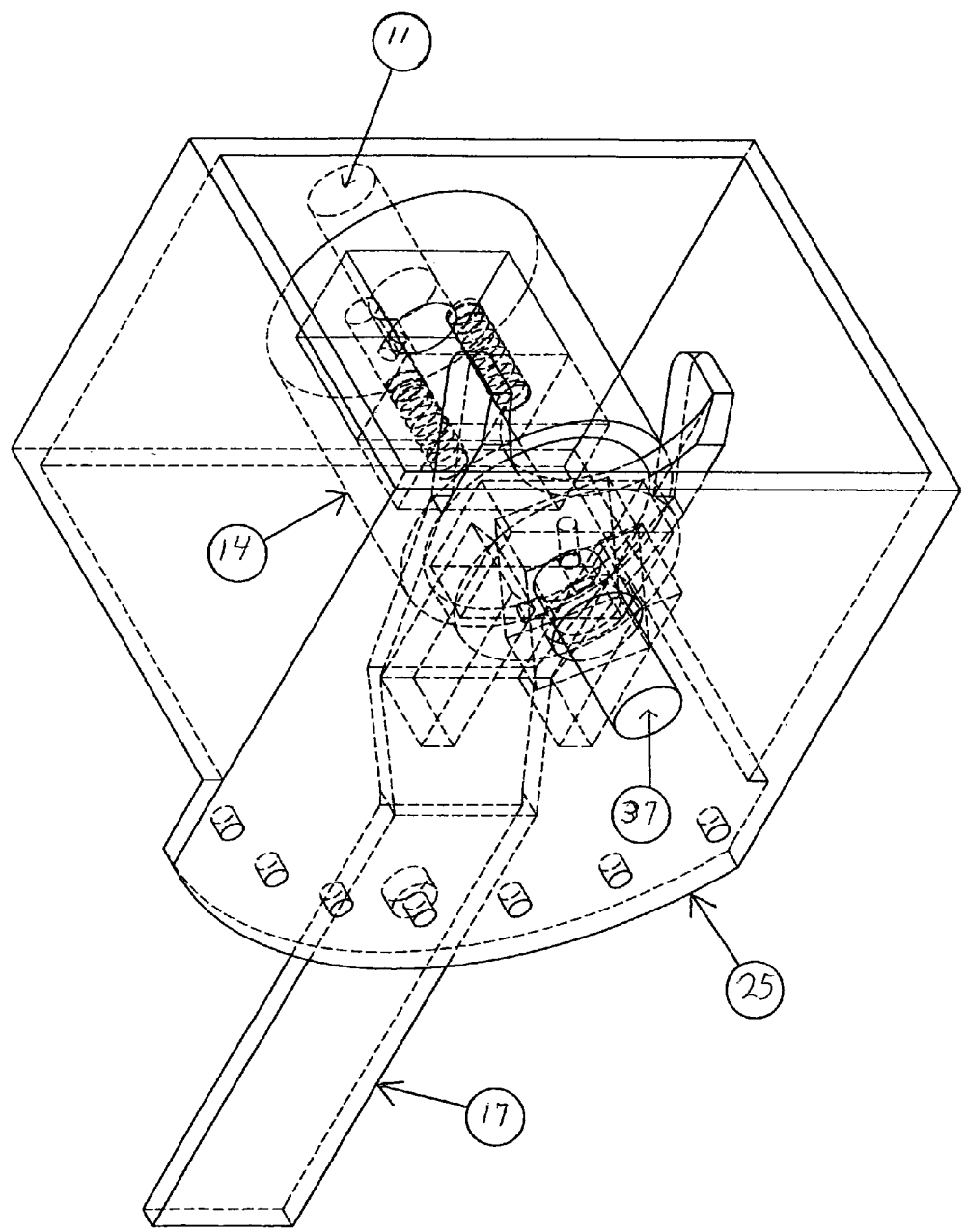
FIG. 1 is a perspective bottom view of a complete assembly of all parts of the invention with handle inserted.

FIG. 1 is a view of the complete invention, showing the input shaft from actuator 11, the coupling 14 with all internal parts, the housing 25 and the output shaft to valve 37. As shown, the handle 17 is installed and indicates that the valve is under manual control and is in mid-position. No dimensions are shown on this or any drawings shown, as the device and all parts hereto will be sized as needed depending on the size of the actuator and valve used. The design of the input from the actuator and the output to the valve shafts will depend on the actual equipment used and the designs shown for these parts are only shown to demonstrate how the invention connects to these componates. All parts can be scaled up or down proportionally as needed.

Figure 2:
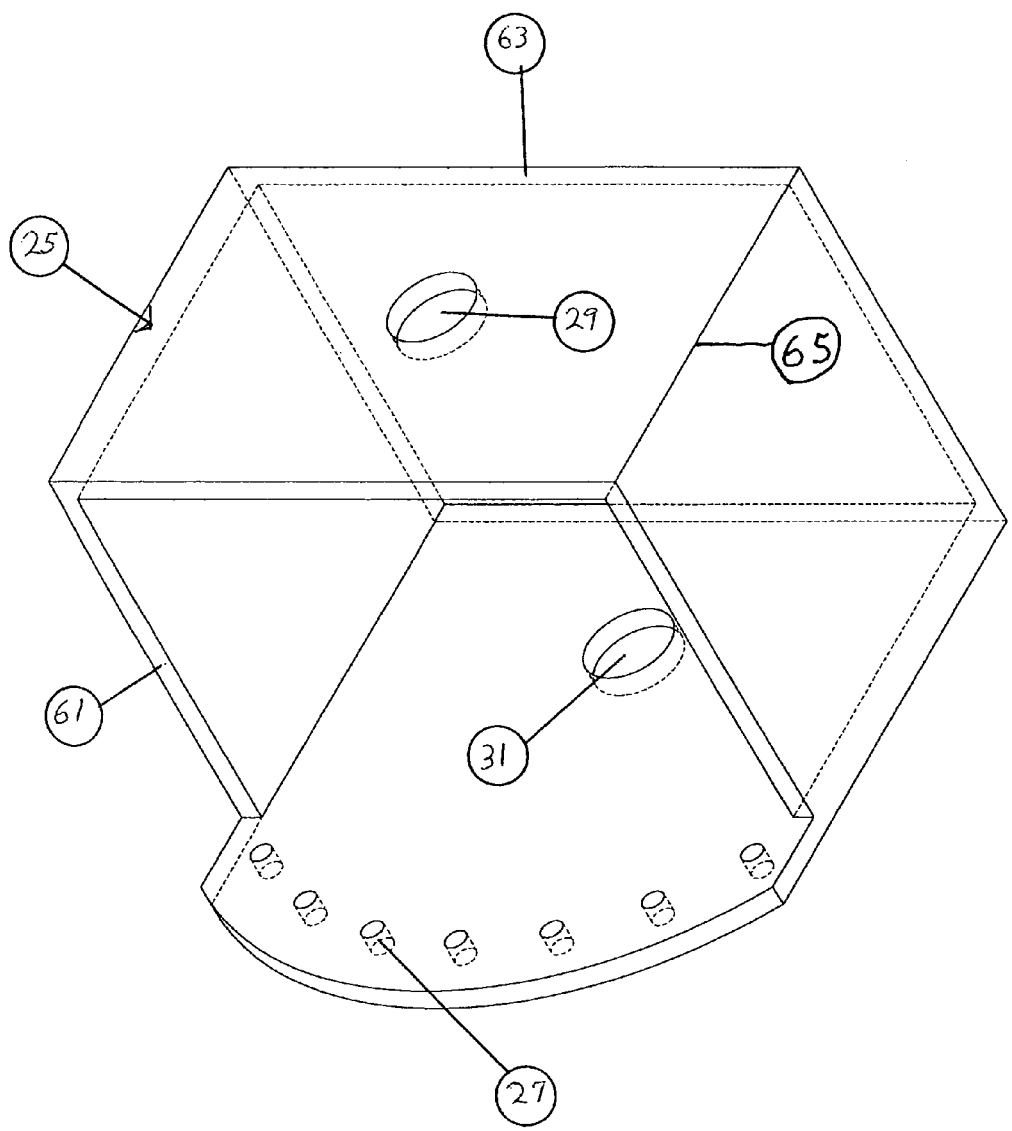
FIG. 2 is a perspective view of a housing only, showing openings for valve and actuator shafts and locking holes for handle.

FIG. 2 is a view of the housing 25 showing the locking holes in the housing 27 for locking the handle 17 and the locations where the valve actuator and the valve would mount. Actual details of valve and actuator mounting are to be determined by actual equipment used. All the other parts internal parts are removed for clarity of view for the housing 25. The height of housing 61, from the actuator input hole 29 to the valve output hole 31 is governed by the length of the coupling 14 plus the thickness of the handle 17 where the tabs 23 are located from the bottom of the tabs 23 to the top of the handle 17. This distance allows the handle 17 to lift the coupling 14 up and away from the driven piece 35 to fully disconnect it from the coupling 14. The ratio of the width of housing 63 to the depth of housing 65 is scaled to provide room for the handle 17 to rotate the amount required for full valve travel when manual control is used. The locking holes 27 in the housing 25 are arranged so that when the handle 17 is fully engaged with the driven piece 35 the lockhole in the handle 17 can line up to provide any lockable valve position from full open to full closed as desired by the user, this may be one or more holes.

Figure 3:
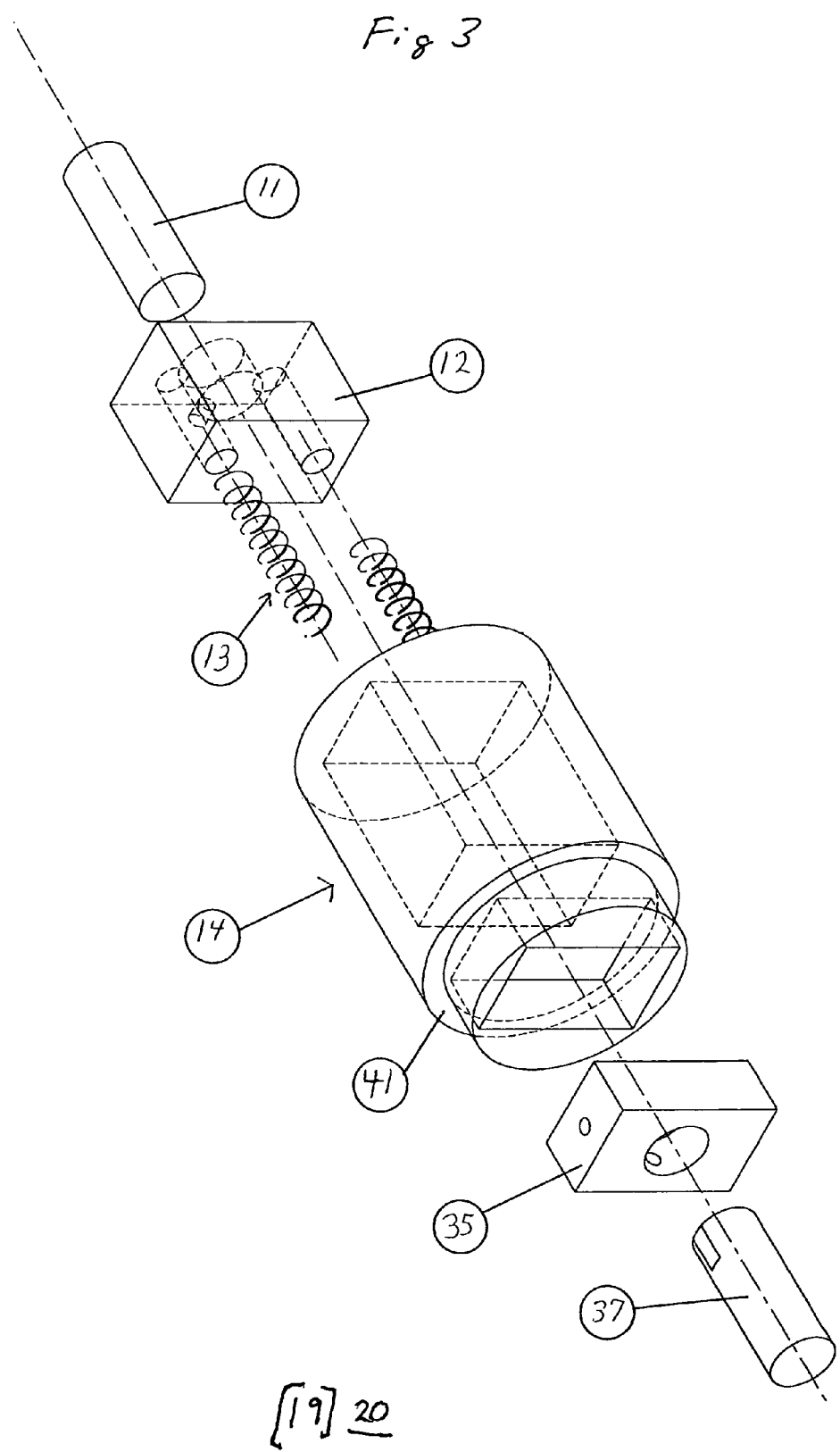
FIG. 3 is an exploded view of a coupling with internal parts and shafts for actuator and valve.

FIG. 3 is an exploded view of the coupling 14 and its internal parts including, drive piece 12 with springs 13 and driven piece 35. The input shaft from actuator 11 and the output shaft to valve 37 are shown and the final design of these parts will drive the final design of the connections to the drive and driven pieces. The drive piece 12 and the driven piece 35 will be machined as needed to connect to the actuator and valve shafts. The end of the coupling 14 located nearest the valve output shaft has that end machined to accept the ears 21 of the handle 17 and provide a lifting surface 41. The lifting surface 41 diameter is the same as the gap between the ears 21 on the handle 17. A means for securing input shaft from actuator 11 to drive piece 12 and a means for securing output shaft to valve 37 driven piece 35 will ensure the distance between the drive piece 12 and the driven piece 35 are held constant and stay in alignment by the fact the actuator and the valve are firmly attached to the housing 25.

Figure 4:
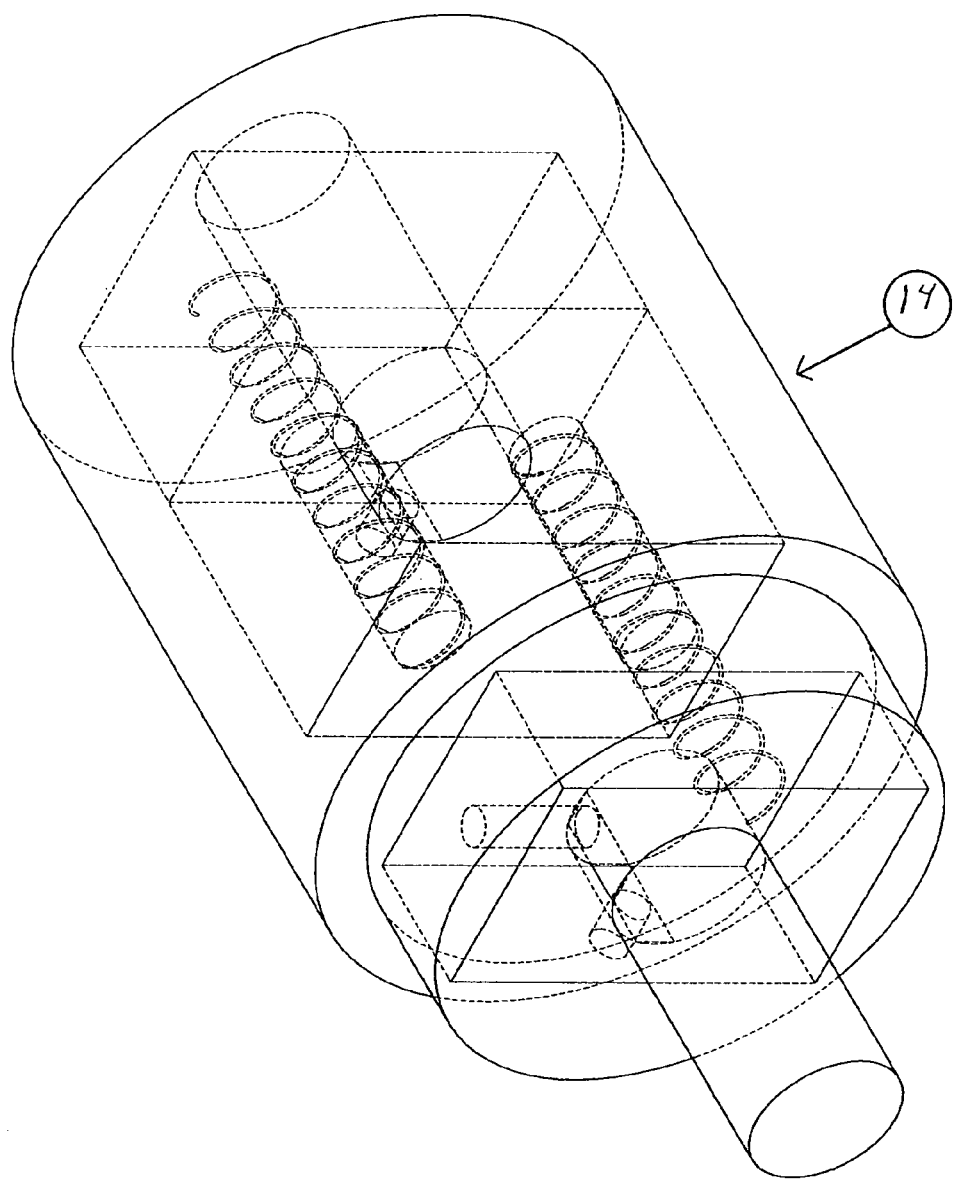
FIG. 4 is a perspective view of a coupling with internal parts and valve and actuator shafts shown in normal position.

FIG. 4 is a cross sectional view of details of the coupling 14 showing the drive and driven pieces as engaged to provide normal automatic action. In this view, torque from the actuator is passed directly to the valve for normal automatic valve operation.

Figure 5:
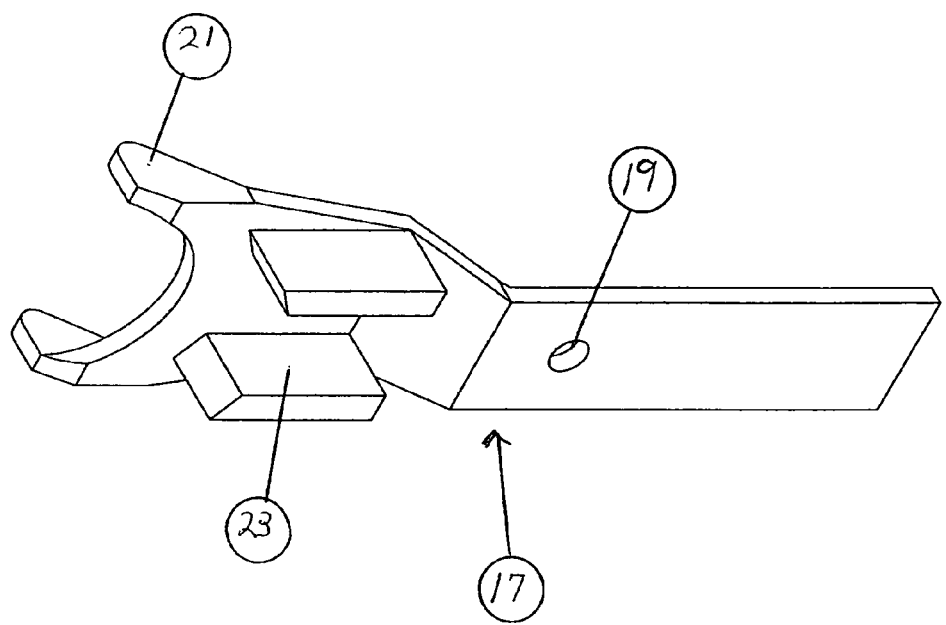
FIG. 5 is a perspective view of a handle showing ears, tabs and lock hole.

FIG. 5 is a view of the handle 17 showing the ears 21, the tabs 23 and the locking hole in handle 19 that will, with the handle 17 fully inserted, align with any of the locking holes in the housing 27. A common lock installed in this locking hole in handle 19 and any of the locking holes in the housing 27 will secure the handle 17 in place and provide a positive position control for a valve.

Figure 6:
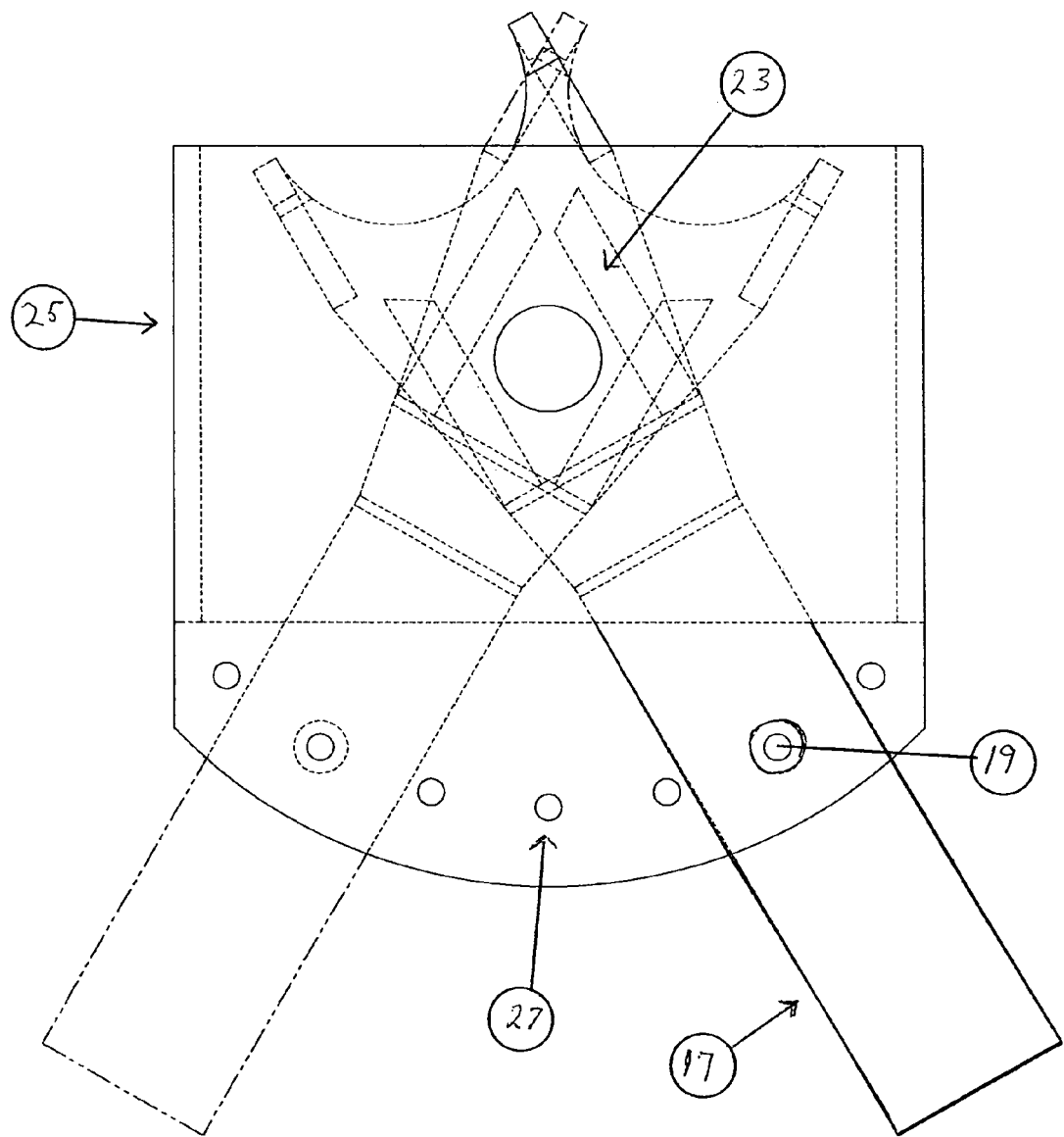
FIG. 6 is a top view of the housing with the handle shown in two of many positions available showing movement of handle to control valve position.

FIG. 6 is a view of the housing 25 with the handle 17 shown in two of many available positions. This view shows the position of the tabs 23 as they would relate to the driven piece 35 with the handle 17 fully inserted. The two positions of the handle 17 show how the locking holes in the housing 27 would align with the locking hole in handle 19 to provide a means to secure the valve in a fixed position with a locking device.

Figure 7:
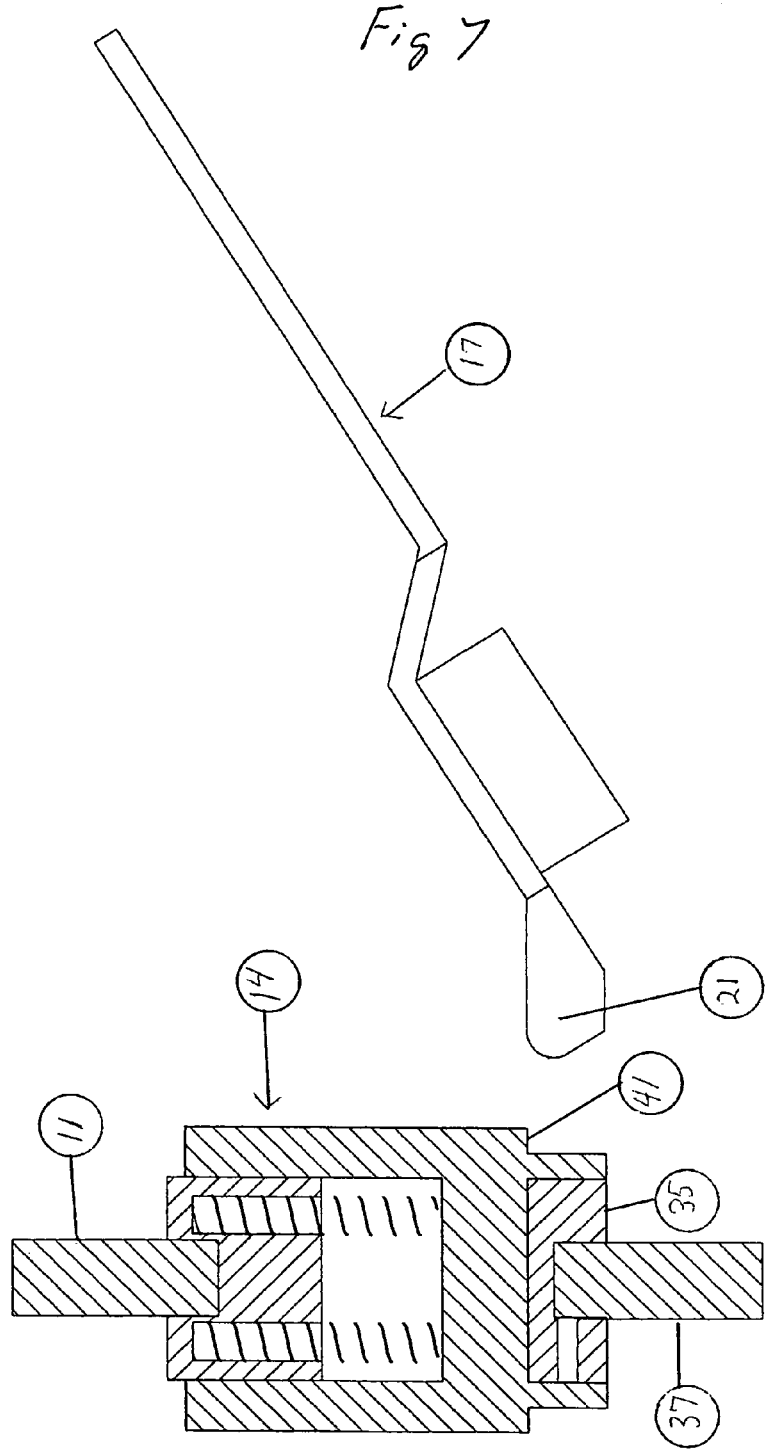
FIG. 7 is a side view of a coupling only, shown with handle ready to be inserted.
Figure 8:
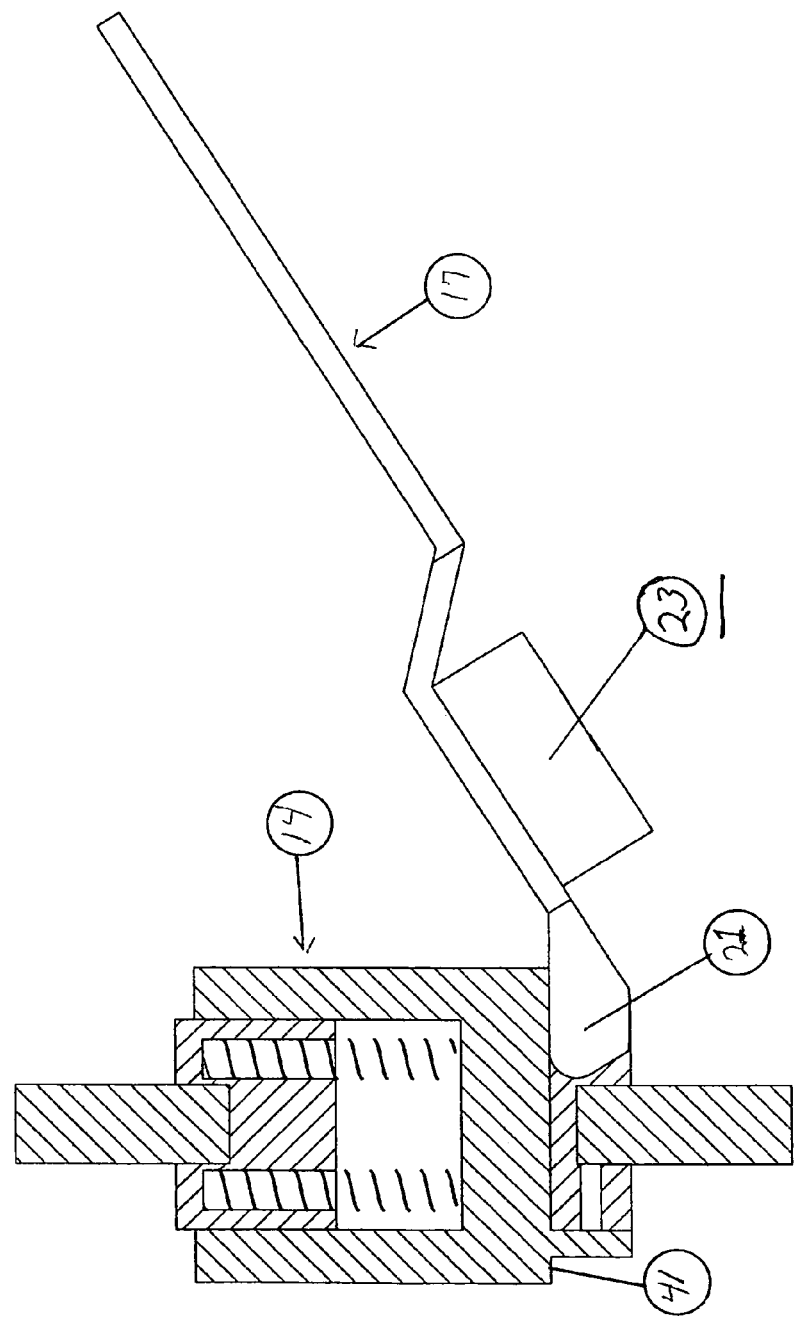
FIG. 8 is aside view of a coupling, shown with handle started into place.
Figure 9:
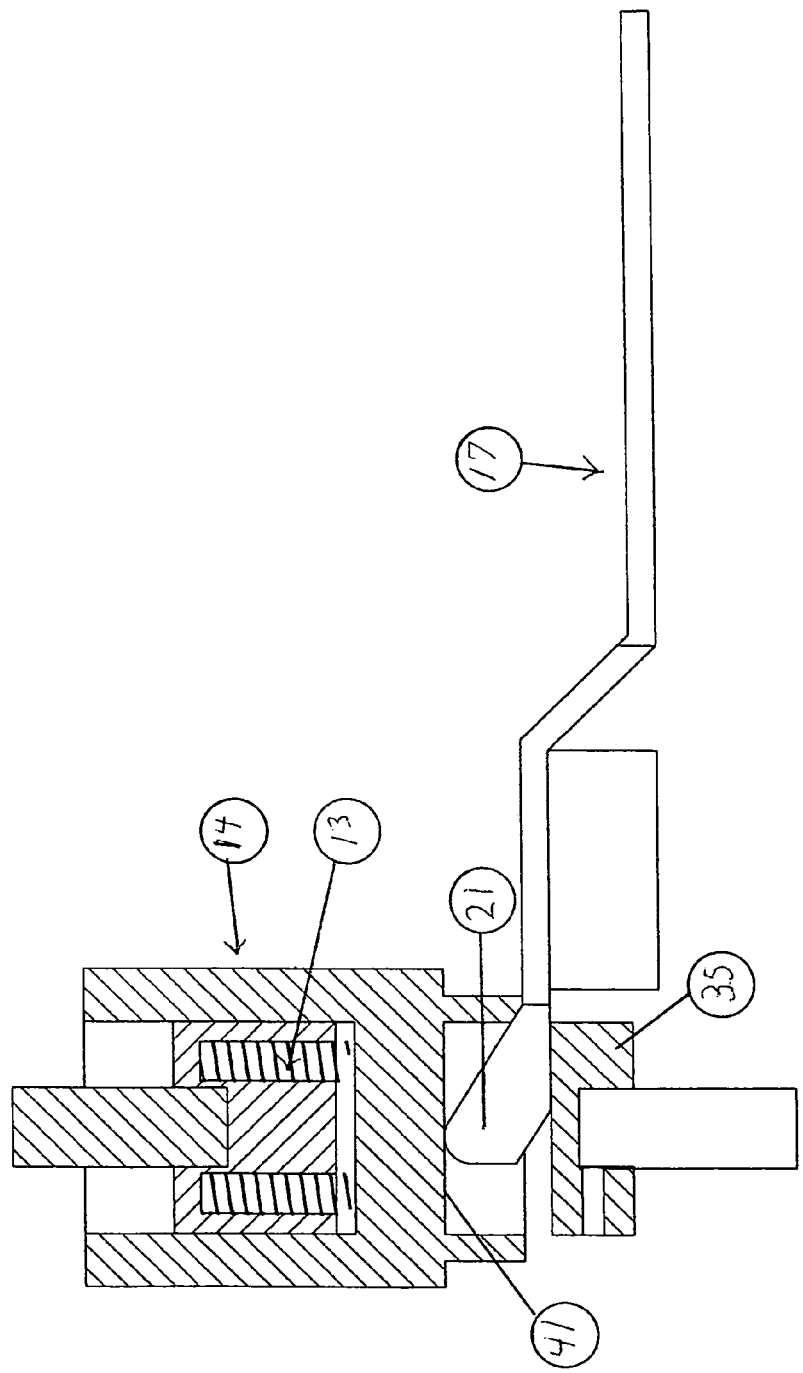
FIG. 9 is a side view of a coupling shown with the handle now pressed down, separating the coupling from the driven piece.
Figure 10:
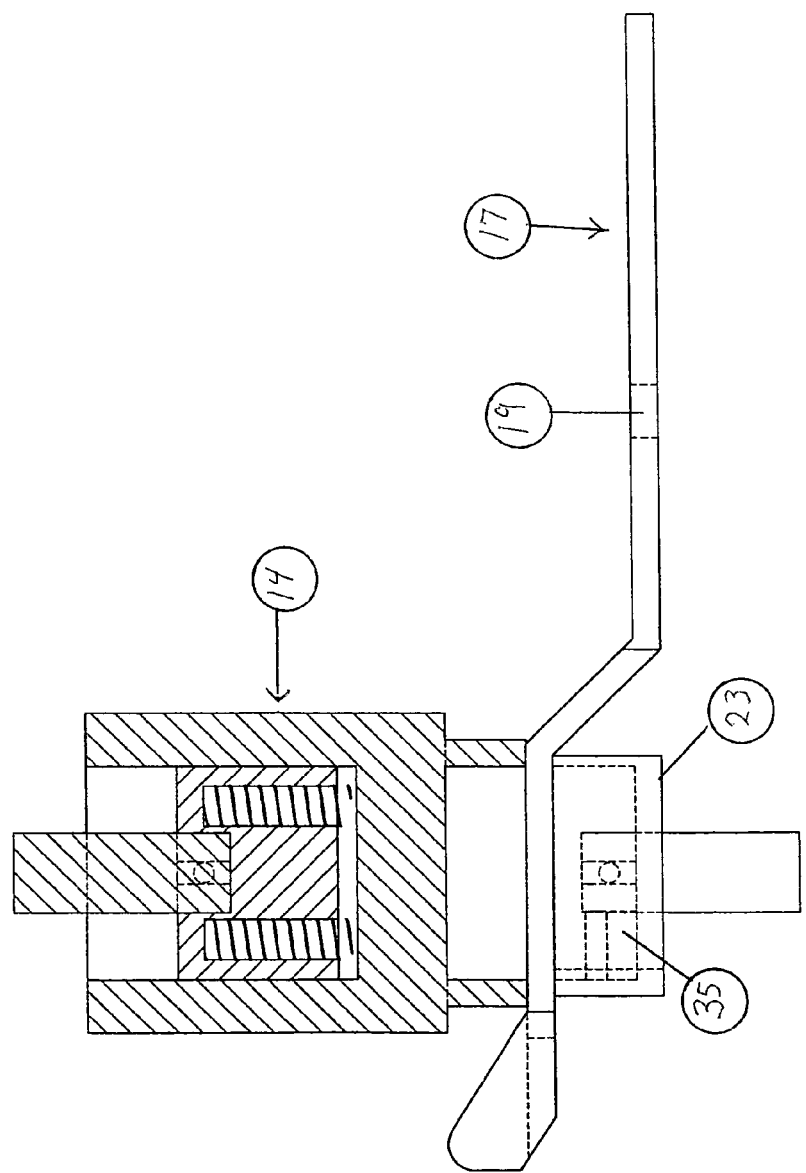
FIG. 10 is a side view of the handle fully inserted, actuator disengaged, tabs locked onto the driven piece, manual control of valve established.

FIGS. 7, 8, 9 & 10 when viewed in order, show the action of the automatic valve manual lockout in transition from auto to manual control. The housing 25 is not shown to provide a clear view of the action of the coupling 14 and handle 17. As the handle 17 is inserted as shown in FIG. 8, the ears 21 align with the lifting surface 41 of the coupling 14. In FIG. 9, the handle 17 is pushed down towards the locking holes in the housing 27, thus raising the coupling 14 to uncouple the actuator from the driven piece 35. The springs 13 collapse as the coupling 14 raises up around the drive piece 12. This action renders it safe to move the handle 17 in toward the shaft axis and engage the driven piece 35 as shown in FIG. 10. Now a locking device can be placed through the locking hole in the handle 19 and any of the locking holes in the housing 27 at any of the positions desired. FIGS. 7 though 10 viewed in reverse show the return to automatic operation.

FIG. 7 is a view of the coupling 14; it's internal parts, the input shaft from the actuator 11 and the output shaft to valve 37, with the handle 17 ready to be inserted. The springs 13 are fully extended holding the coupling 14 engaged to the driven piece 35.

FIG. 8 is the same view as FIG. 7 except it shows the ears 21 of the handle 17 engaging the lifting surface 41 of the coupling 14. The ears 21 of the handle 17 are the same internal distance apart as the diameter of the lifting surface 41 of the coupling 14.

FIG. 9 now shows the handle 17 pressed down, acting on the lifting surface 41 of the coupling 14, causing it to rise and disengage from the driven piece 35. Note that the housing 25, not shown, would hold the drive piece 12 and the driven piece 35 the same distance apart at all times with only the coupling rising as the handle is levered down.

FIG. 10 shows the handle 17 fully inserted and the tabs 23 of the handle 17 are engaging the driven piece 35. Now, full manual control of the valve is accomplished and the locking hole in handle 19 may be aligned with any of the locking holes in the housing 27 to provide a means of locking the valve in any position as shown in FIG. 6. Removing the handle 17 restores the automatic valve function by either manually returning the valve to the actuator position before removing it or by operation of the actuator until the coupling 14 aligns itself with the driven piece 35 and the springs 13 force the coupling 14 onto the driven piece 35.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A device for taking manual control of an automatically controlled rotary valve to provide a method of providing lockable positive position control comprising:
   (a) a housing for mounting a valve actuator and valve, having a set of locking holes arranged to align with a locking hole in a handle when said handle is engaged with a coupling thus disconnecting said valve actuator from said valve,
   (b) said coupling contained in said housing slides up a driven piece against a set of springs and away from a drive piece by the use of said handle,
   (c) said handle engages said coupling with a set of ears formed to fit a lifting surface of said coupling and when said coupling is clear of said driven piece, a set of tabs on the underside of said handle engage said driven piece taking manual control of said valve,
   whereby any normal valve powered by a rotary actuator may be manually and locally controlled and locked in any number of fixed positions with said handle and returned to said automatic control with removal of said handle without the need of any other tools.

* * * * *